US012630144B2

(12) United States Patent
Caldwell

(10) Patent No.: US 12,630,144 B2
(45) Date of Patent: May 19, 2026

(54) HYBRID VEHICLE BATTERY MAINTENANCE SYSTEM

(71) Applicant: Caterpillar Inc., Peoria, IL (US)

(72) Inventor: Curtis John Caldwell, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 287 days.

(21) Appl. No.: 18/376,551

(22) Filed: Oct. 4, 2023

(65) Prior Publication Data

US 2025/0115232 A1 Apr. 10, 2025

(51) Int. Cl.
*B60W 20/13* (2016.01)

(52) U.S. Cl.
CPC ......... *B60W 20/13* (2016.01); *B60W 2300/17* (2013.01); *B60W 2510/244* (2013.01); *B60W 2530/209* (2020.02); *B60W 2710/244* (2013.01)

(58) Field of Classification Search
CPC ........... B60W 20/13; B60W 2510/244; B60W 2530/209; B60W 2710/244; B60W 2300/17
See application file for complete search history.

(56) References Cited

U.S. PATENT DOCUMENTS

| | | | |
|---|---|---|---|
| 8,080,971 B2 | 12/2011 | Bose et al. | |
| 2006/0038532 A1* | 2/2006 | Taniguchi | B60L 1/00 320/103 |
| 2013/0238180 A1* | 9/2013 | Bold | B60W 20/00 701/22 |
| 2015/0112522 A1* | 4/2015 | Liang | B60W 10/08 180/65.265 |
| 2016/0159220 A1* | 6/2016 | Enomoto | B60L 1/006 701/22 |

FOREIGN PATENT DOCUMENTS

| | | |
|---|---|---|
| CN | 114619919 A | 6/2022 |
| KR | 101198667 B1 | 11/2012 |
| KR | 20210066059 A | 6/2021 |

* cited by examiner

*Primary Examiner* — Lori Wu

(57) ABSTRACT

A battery maintenance system for a vehicle, including a battery mounted to the vehicle, the battery having a charge level, an electric motor connected to a ground engaging member of the vehicle, a hybrid power source mounted to the vehicle, and configured, at least in part, to provide electric power with the battery to power the electric motor, and a control module mounted to the vehicle, the control module configured to probe the battery when the vehicle is in a sleep state, determine whether the charge level of the battery is above a minimum level, and if not, activate the hybrid power source to deliver electrical power to the battery at least until the charge level of the battery is above the minimum level.

20 Claims, 4 Drawing Sheets

HYBRID VEHICLE BATTERY MAINTENANCE SYSTEM

TECHNICAL FIELD

The present disclosure generally relates to work machines, and more specifically relates to battery systems for work machines.

BACKGROUND

Mobile work machines such as dump trucks, excavators, track type tractors and the like may be used in heavy industries such as mining, construction, and others to transport materials and personnel. These work machines are often large in size, and require an operator, e.g., a driver, to manually operate the machine in order for the machine to perform its designated/intended operations.

Some work machines may be hybrid vehicles, in other words, powered by hybrid power systems. Hybrid vehicles use a conventional internal combustion engine along with an electric motor supplied with power through a battery. The battery is continuously recharged by the internal combustion engine, such as with a connection to a generator. Hybrids can operate in one of two ways. First, a hybrid can operate in a parallel design, wherein an energy conversion unit and electric propulsion system are connected directly to the vehicle's wheels. The internal combustion engine is mainly used for driving while the electric motor provides added power when an energy boost is needed. Second, a hybrid can operate in a series design, wherein the internal combustion engine is connected to the generator to produce electricity to charge the battery of the electric motor. The electric motor then powers the wheels of the vehicle. Many hybrid vehicles are also able to use regenerative braking to store and convert energy normally lost through braking and deceleration into useful power.

Plug-in vehicles essentially are hybrids with the added advantage of a larger battery and the ability to recharge externally at a power source.

Fuel cell electric machines (FCEM) are able to generate electricity through the use of hydrogen reacting with oxygen in a fuel cell, and the electricity can be used to charge a battery which in turn powers an electric motor. The hydrogen can be present in the cell or can be converted from another fuel. The hydrogen produced can also be stored within gas tanks in the car. The fuel cell produces average power required to drive the vehicle on highway while batteries and ultra-capacitors provide transient power. FCEMs have virtually no emissions.

Work machines, and especially those powered by hybrid power systems, may require high voltage battery packs to provide electrical power to the work machine. Large work machines may require a great amount of electrical power and as such, the battery packs may be configured to deliver the electrical power in various capacities such as 750 volts, 1500 volts, or any other capacities as known and required.

Work machines may operate as part of a fleet. Often, individual work machines may sit for months at a time in a stand by mode or a sleep state where minimal systems of the work machine are provided with electric power. Over time, the battery packs of hybrid work machines may discharge electric power to feed the system of the work machine while in its sleep state. Cold weather may more rapidly affect the discharging of the battery packs.

There is a need for a system within the work machine to monitor the state of charge of the battery packs and to generate electrical power to charge the battery packs if the state of charge falls below a desired level.

SUMMARY OF THE DISCLOSURE

In accordance with one aspect of the disclosure, a vehicle may be provided. The vehicle may have a frame, a power source supported by the frame, a control module configured to control operation of the vehicle, and a battery for providing electrical power to the vehicle, the battery having a charge level. The vehicle may have a battery maintenance system configured to identify that the vehicle is in a sleep state, probe the battery, via the control module, based on identifying that the vehicle is in the sleep state. The battery maintenance system may determine, based on probing of the battery, whether the charge level of the battery is not above a minimum level. The battery maintenance system may activate the power source, based on determining that the charge level of the battery is not above the minimum level, to deliver the electrical power to the battery at least until the charge level of the battery is above the minimum level.

In accordance with another aspect of the disclosure, a battery maintenance system for a vehicle is provided. The battery maintenance system may include a battery mounted to the vehicle, the battery having a charge level. The battery maintenance system may include an electric motor connected to a ground engaging member of the vehicle, and a hybrid power source mounted to the vehicle, and configured, at least in part, to provide electric power with the battery to power the electric motor. The battery maintenance system may include a control module mounted to the vehicle, the control module configured to probe the battery when the vehicle is in a sleep state, determine whether the charge level of the battery is above a minimum level, and if not, activate the hybrid power source to deliver electrical power to the battery at least until the charge level of the battery is above the minimum level.

In accordance with yet another aspect of the disclosure, a method for charging a battery in a vehicle. The method may include monitoring a state of charge of the battery when the vehicle is in a dormant state, the vehicle including a hybrid power system including one or more electric motors and a power source, both connected to the battery. The method may include determining that the state of charge of the battery is above a minimum level while the vehicle is in the dormant state, the vehicle subsequently remaining in the dormant state. The method may include determining, after determining that the state of charge of the battery is above the minimum level and with the vehicle remaining in the dormant state, that the state of charge of the battery is below the minimum level. The method may include activating the power source to generate electrical power. The method may include charging the battery, via the power source, at least until the state of charge of the battery is above the minimum level.

These and other aspects and features of the present disclosure will be more readily understood when read in conjunction with the accompanying drawings.

DETAILED DESCRIPTION

Figure 1:
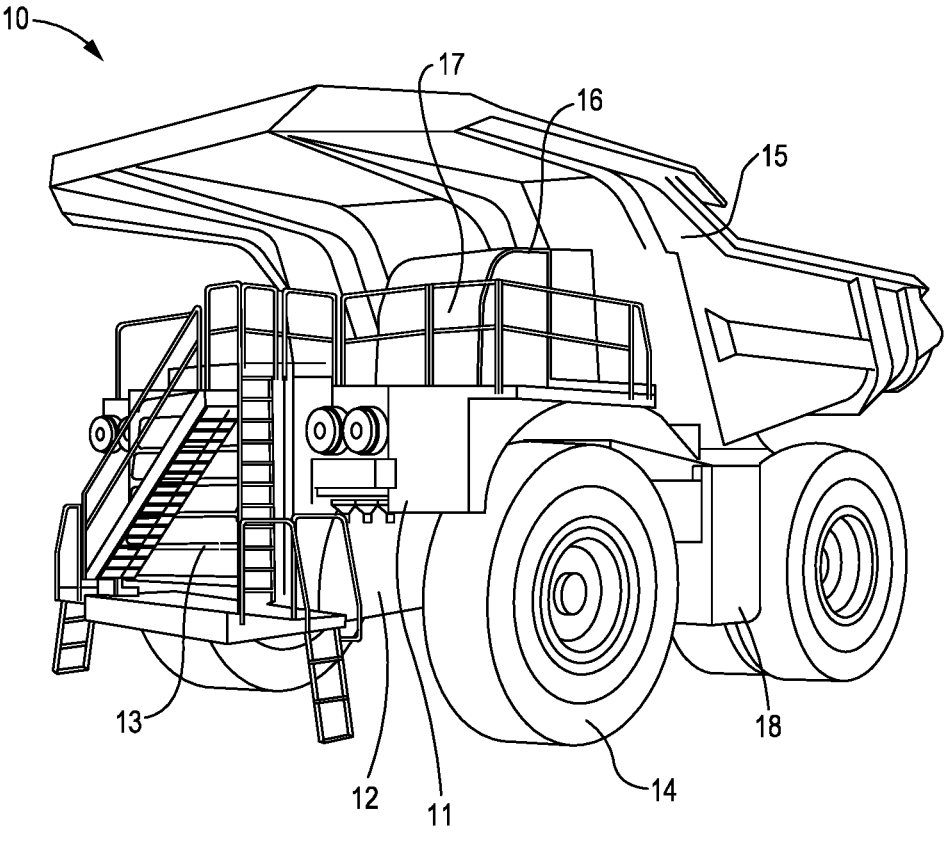
FIG. 1 is a is a perspective view of a work machine constructed in accordance with an embodiment of the present disclosure.

Referring now to the drawings, and with specific reference to FIG. 1, a work machine is depicted and generally referred to using reference numeral 10. The work machine 10 is exemplarily embodied in the form of a mining truck. While the work machine 10 is depicted as a mining truck, it should be noted that a type of machine used is merely exemplary and illustrative in nature. It will be acknowledged that the teachings of the present disclosure can be similarly applied to other types of work machines including but not limited to automobiles, on and off highway trucks, excavators, track-type tractors, and other types of machines having hybrid powertrain systems as known to person skilled in the art.

Work machines are heavy machinery which may be configured to perform a variety of tasks. The exemplary work machine 10 is supported by a frame 11. The work machine 10 may include a drivetrain 12 powered by a engine 13 and driving ground-engaging members 14 contacting the ground and supporting the frame 11 in order to operate the work machine 10. The work machine 10 may also include an implement 15 to perform a work job. In the view of FIG. 1, since the work machine 10 is a mining truck, the implement 15 is exemplarily depicted as a dump body, but with other machines the implement may be other types of work implements known to persons skilled in the art. The work machine 10 may also include an operator cabin 16 for an operator to control the operation of the work machine 10. The operator cabin 16 may include a control module 17 for the operator to use to direct the work machine 10. The work machine may also include a battery pack 18 in order to power the electrical systems of the work machine 10.

Figure 2:
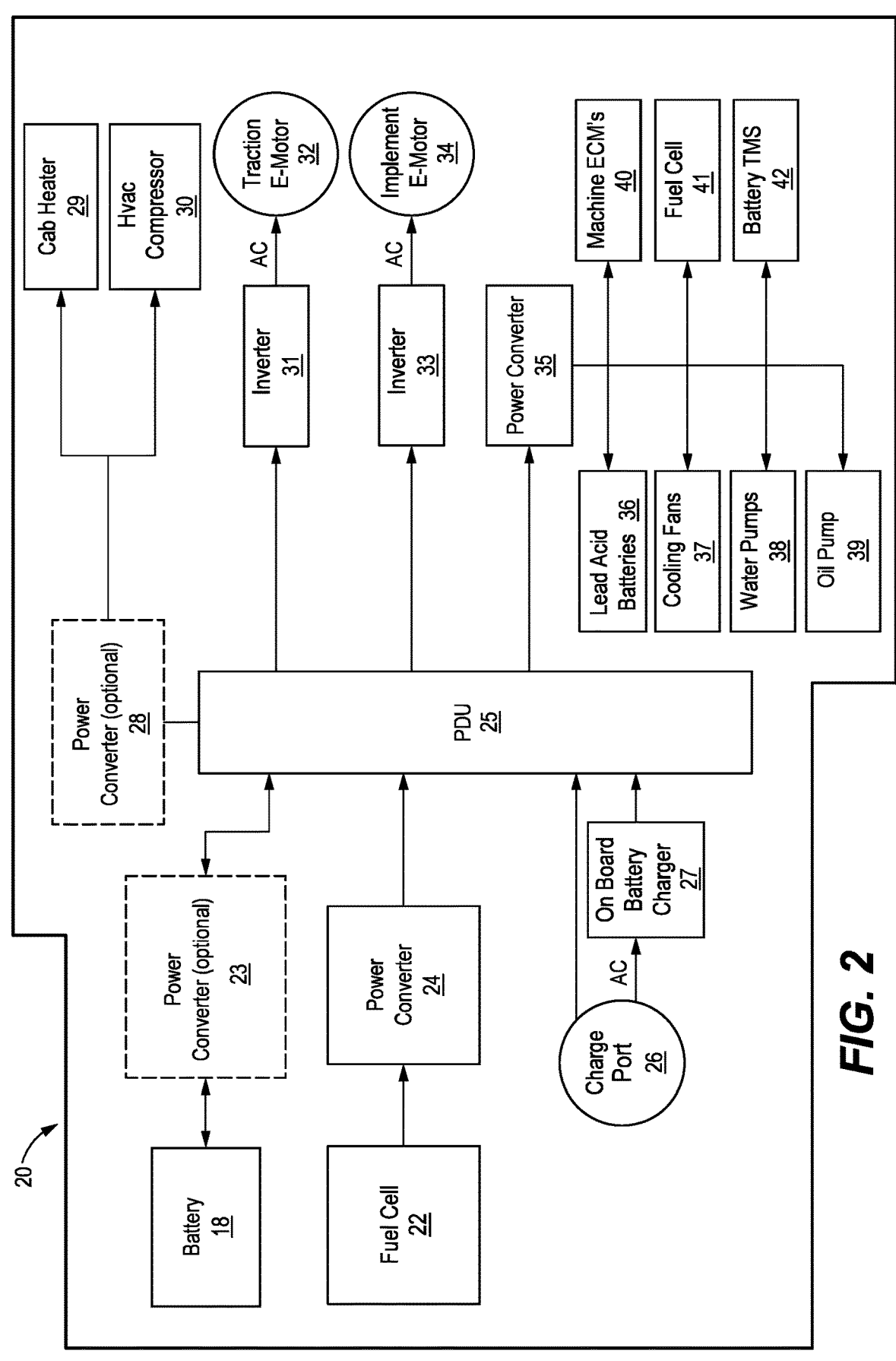
FIG. 2 is a schematic block diagram depicting the electrical systems of a work machine with a hybrid power system including a fuel cell electric system constructed in accordance with an embodiment of the present disclosure.

FIG. 2 depicts an exemplary block diagram of a primary electrical system 20 of the work machine 10 when the work machine 10 is powered by a hybrid power system. In the primary electrical system 20 of FIG. 2, the hybrid power system is a series type fuel cell electric hybrid power system (FCEM), including the battery pack 18 and a fuel cell 22. The fuel cell 22 may be composed of one or more fuel cells, and one fuel cell 22 is depicted in FIG. 2.

The battery pack 18 is connected to a battery management system 21 (BMS) that may be connected to a battery converter 23 to provide electrical power at a constant voltage to a control module 25. In the exemplary embodiment of FIG. 2, the battery converter 23 is a direct current to direct current (DC/DC) converter, although other converters may be required as needed. The control module 25 may include a power distribution unit (PDU), or power delivery unit (e.g., without a software component), one or more electronic control units (ECUs) that include software and/or logic capability to interface the battery management system 21 with one or more communication and/or information components associated with the vehicle (e.g., one or more sensors, such as a hydrogen level sensor), and/or other control modules.

Similar to the battery pack 18, each of the fuel cell 22 may be connected to a fuel cell converter 24 to provide additional electrical power to the control module 25. As with the battery converter 23, the fuel cell converter 24 may be a direct current to direct current (DC/DC) converter, although other converters may be required as needed. As shown in the primary embodiment, the control module 25 may be configured to only receive electrical power from the fuel cell 22 through the fuel cell converter, and may be configured to both send and receive electrical power from the battery pack 18 through the battery converter 23.

Optionally, the primary electrical system 20 of the work machine 10 may be provided with a charging system to supply electrical power to the work machine 10 through an external source. A charge port 26 may be provided on the work machine 10, and may be configured to connect to common electrical connectors as known. The charge port 26 may be configured to send electrical power to the control module 25 either through direct current (DC) or alternating current (AC) electrical signals. In order to convert an AC electrical power signal to a DC power signal for the control module 25, a charging module 27 may be placed between the charge port 26 and the control module 25. The charging module 27 may be configured to detect the power signal into the charge port 26 and convert an AC signal into a DC signal appropriate for the control module 25.

The control module 25 may be configured to send electrical power generated from the battery pack 18 and the fuel cell 22 to a number of electrical subsystems. The control module 25 may send electrical power to the operator cabin 16 for operator comfort systems such as a cab heater 29 or a HVAC compressor 30 through a cabin converter 28. The control module 25 may send electrical power to a traction motor inverter 31, which may send and receive electrical power from a traction electric motor 32. The traction motor inverter 31, may send any excess electrical power generated from the traction electric motor 32 back to the control module 25. The control module 25 may also send and receive electrical power from an implement motor inverter 33, which may in turn send electrical power to an implement electric motor 34.

The control module 25 may also be configured to send electrical power to a subsystem converter 35, which may also be configured to distribute electrical power to other components of the work machine 10 such as a lead acid battery 36, a cooling fan 37, a water pump 38, a lube oil pump 39, an engine control module 40, a fuel cell controller 41, and a battery temperature management system 42.

Figure 3:
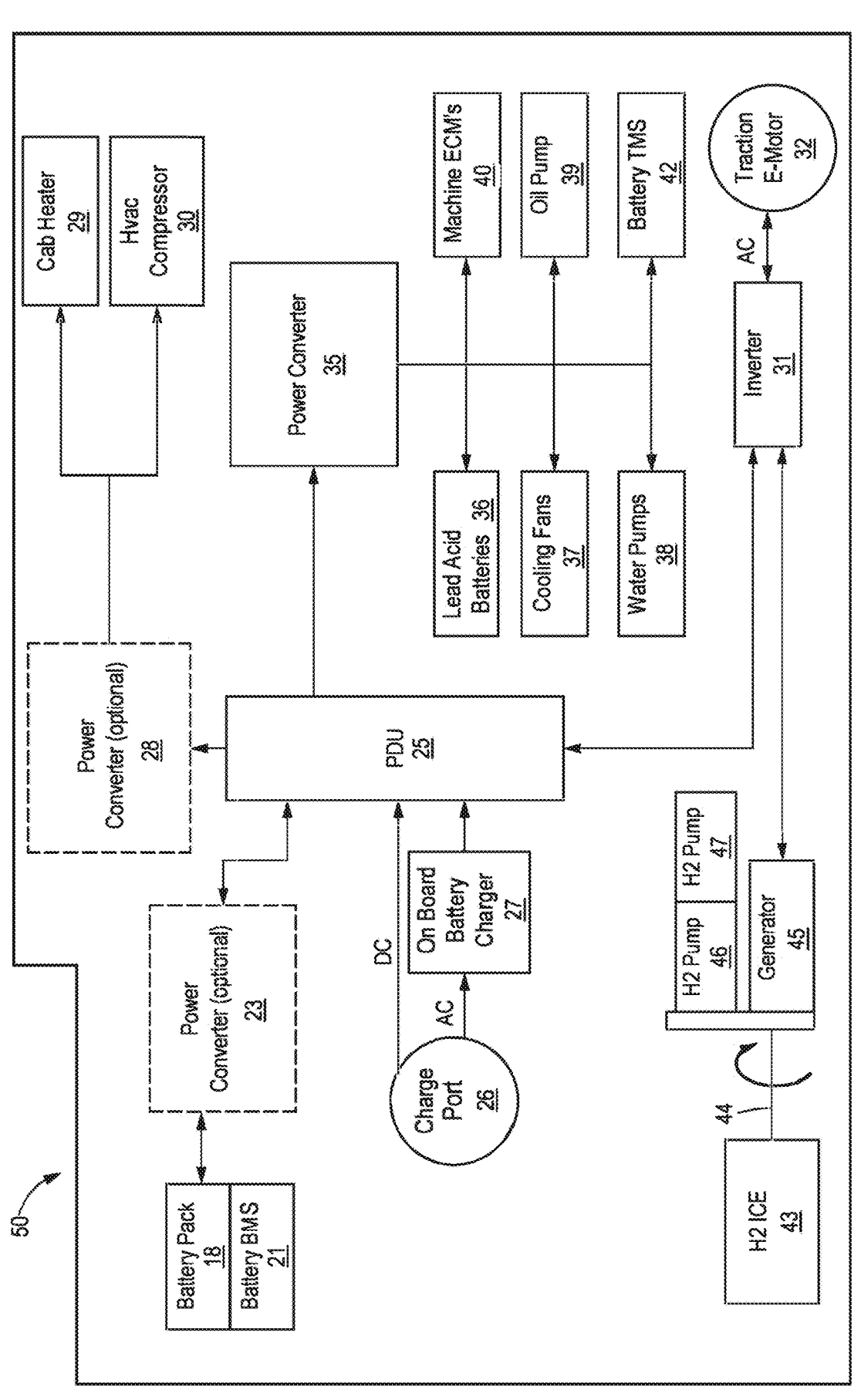
FIG. 3 is a schematic block diagram depicting the electrical systems of a work machine with a hybrid power system including a hydrogen internal combustion engine constructed in accordance with an embodiment of the present disclosure.

FIG. 3 depicts another exemplary block diagram of a primary electrical system 50 of the work machine 10 when the work machine 10 is powered by a hybrid power system. In the primary electrical system 50 of FIG. 3, the hybrid power system is a series type internal combustion hybrid power system, including the battery pack 18 and a hydrogen internal combustion engine 43.

The primary electrical system 50 having the series type internal combustion hybrid power system is similar to the primary electrical system 20 as shown in FIG. 2. Similar to the primary electrical system 20, the control module 25 of the primary electrical system 50 may be configured to send and receive electrical power through the battery pack 18 controlled by the battery management system 21, and delivered through the battery converter 23. The control module 25 may also receive electrical power through the charge port 26 and the charging module 27.

The control module 25 of the primary electrical system 50 may also be configured to send electrical power to the operator cabin 16 for the operator comfort systems such as the cab heater 29 or the HVAC compressor 30 through the cabin converter 28. The control module 25 may also be configured to send electrical power to the subsystem converter 35, which may also be configured to distribute electrical power to other components of the work machine 10 such as the lead acid battery 36, the cooling fan 37, the water pump 38, the lube oil pump 39, the engine control module 40, and the battery temperature management system 42.

The control module 25 of the primary electrical system 50 may also send and receive electrical power from the traction motor inverter 31, which may send and receive electrical power from a traction electric motor 32. The hydrogen internal combustion engine 43 may be connected by a shaft 44 to a generator 45, which may send and receive electrical power from the traction motor inverter 31. Energy generated from the hydrogen internal combustion engine 43 may also used in part by a first hydraulic pump 46 and a second hydraulic pump 47.

When the primary electrical system 20 as depicted in FIG. 2 is in operation, the battery pack 18 may receive electrical power from the fuel cell 22, sent through the fuel cell converter 24, the control module 25, and the battery converter 23. When the primary electrical system 50 as depicted in FIG. 3 is in operation, the battery pack 18 may receive electrical power from the hydrogen internal combustion engine 43, connected by the shaft 44 to the generator 45, and sent through the traction motor inverter 31, the control module 25, and the battery converter 23.

INDUSTRIAL APPLICABILITY

In operation, the teachings of the present disclosure can find applicability in many industries including but not limited to work machines used in the earth moving, mining, agricultural, and construction industries. While depicted and described in conjunction with a mining machine, such teachings can also find applicability with other machines such as automobiles, on and off highway trucks, excavators, track-type tractors, and other types of machines having hybrid powertrain systems.

Figure 4:
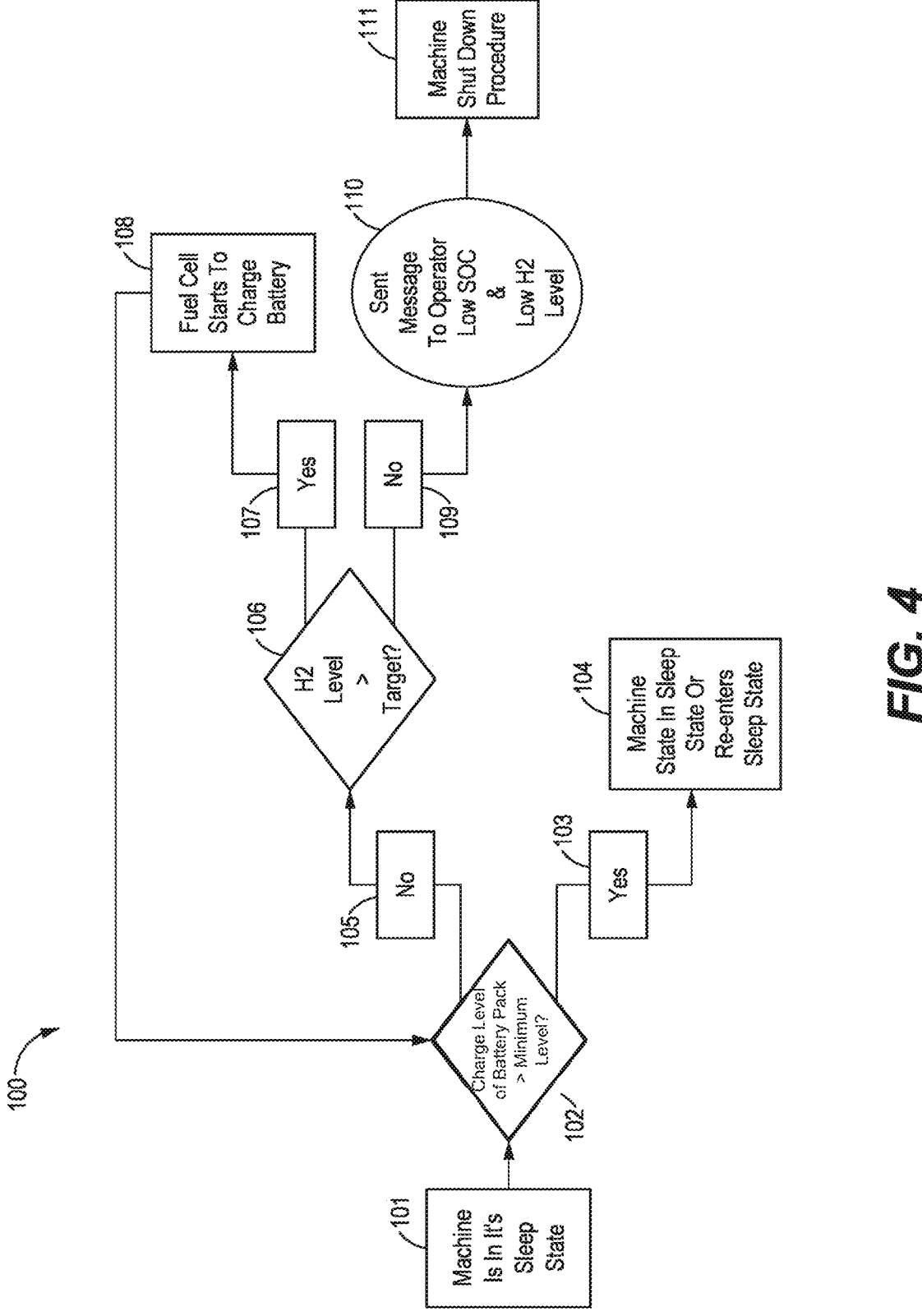
FIG. 4 is a flowchart depicting a sample sequence of steps for operating a battery management system of a vehicle which may be practiced in accordance with the work machine of the present disclosure.

FIG. 4 illustrates a visual representation of a method 100 of charging the battery pack 18 of the work machine 10, particularly when the work machine 10 is in a dormant, or sleep state. In a first step 101, the work machine 10 is placed in a dormant or sleep state. The control module 25 of the work machine 10 may discharge electrical power to limited subsystems of the work machine 10, thereby draining electrical power from the battery pack 18. The battery management system 21 connected to the battery pack 18 continuously monitors a state of charge of the battery pack 18, and in a second step 102 determines whether or not the state of charge of the battery pack 18 is above a certain minimum level. In a third step 103, the battery management system 21 determines that the state of charge is above the minimum level and prompts the control module 25, in a fourth step 104, to either remain in a sleep state, or re-enter the sleep state. If, in a fifth step 105, the battery management system 21 determines that the state of charge is not above the minimum level, the battery management system 21 prompts the control module 25 to communicate with the work machine 10 to determine a fuel level. The work machine 10 is powered in part by either the fuel cell 22 or the hydrogen internal combustion engine 43, thus requiring fuel in the form of hydrogen, stored in a hydrogen tank.

In a sixth step 106, the control module 25 determines a hydrogen level based on a hydrogen level sensor connected to the hydrogen tank of the work machine 10, and the battery management system 21 determines whether the hydrogen level is above a hydrogen target. While the work machine 10 of the method 100 is shown to be provided with a hydrogen as a fuel source, similar power sources utilizing other fuel types as known may be provided. In a seventh step 107, the battery management system 21 determines that the hydrogen level is adequate, and prompts the control module 25, in an eighth step 108, to send electrical power to the battery pack 18 until the battery management system 21 determines that the state of charge of the battery pack 18 is above the minimum level.

The battery management system 21 may determine in a ninth step 109 that the hydrogen level of the work machine 10 is not above the hydrogen target. The battery management system 21 then prompts the control module 25, in a tenth step 110, to send a message to an operator that the battery pack 18 has a low state of charge and the hydrogen level is too low to assist in charging the battery pack 18. After sending the message, in an eleventh step 111, the battery management system 21 prompts the control module 25 to have the work machine 10 leave the sleep state and go through a shutdown procedure.

The method 100 of charging the battery pack 18 of the work machine 10 is advantageous to maintain the work machine 10 at an immediate level of readiness for operation in the field. Utilizing the fuel cell 22 or the hydrogen internal combustion engine 43 to charge the battery pack 18 while the work machine 10 is not in operation and in its sleep state allows for less downtime for the work machine 10 to charge the battery pack 18 or replace the battery pack 18 with one having a fresh charge.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A vehicle, comprising:
   a frame;
   a power source supported by the frame;
   a control module configured to control operation of the vehicle;
   a battery to provide electrical power to the vehicle, the battery having a charge level; and
   a battery maintenance system configured to:
       identify that the vehicle is in a sleep state, probe the battery, via the control module, based on identifying that the vehicle is in the sleep state,
       determine, based on probing of the battery, whether the charge level of the battery is above a minimum level or not, and
       activate the power source, based on determining that the charge level of the battery is not above the minimum level and based on a fuel level of the power source being above a fuel target, to deliver the electrical power to the battery at least until the charge level of the battery is above the minimum level.

2. The vehicle of claim 1, wherein the vehicle includes a fuel tank and a fuel level sensor connected to the fuel tank to determine the fuel level of the fuel tank.

3. The vehicle of claim 2, wherein the battery maintenance system is configured to send a message to an operator of the vehicle under a condition where the charge level of the battery is not above the minimum level and the fuel level of the power source is not above the fuel target.

4. The vehicle of claim 1, wherein the power source is an internal combustion engine.

5. The vehicle of claim 1, wherein the power source is a fuel cell electric system.

6. The vehicle of claim 1, wherein the battery is a 24 volt battery.

7. The vehicle of claim 1, wherein the battery is a battery pack.

8. A battery maintenance system for a vehicle, comprising:

a battery mounted to the vehicle, the battery having a charge level;

an electric motor connected to a ground engaging member of the vehicle;

a hybrid power source mounted to the vehicle, and configured, at least in part, to provide electric power with the battery to power the electric motor;

a control module mounted to the vehicle, the control module configured to probe the battery under a condition where the vehicle is in a sleep state, determine whether the charge level of the battery is above a minimum level or not, and if not, and under a condition where a fuel level of the hybrid power source is above a hybrid fuel target, activate the hybrid power source to deliver electrical power to the battery at least until the charge level of the battery is above the minimum level.

9. The battery maintenance system of claim 8, wherein the hybrid power source includes a fuel tank having the fuel level and a fuel level sensor connected to the fuel tank to obtain the fuel level.

10. The battery maintenance system of claim 9, wherein the control module is connected to the fuel level sensor, and is configured to probe the fuel level sensor and alert an operator under a condition where the charge level is not above the minimum level and the fuel level is not above the hybrid fuel target.

11. The battery maintenance system of claim 8, wherein the hybrid power source includes an internal combustion engine.

12. The battery maintenance system of claim 8, wherein the hybrid power source includes a fuel cell electric system.

13. The battery maintenance system of claim 8, wherein the battery is a 24 volt battery.

14. The battery maintenance system of claim 8, wherein the battery is configured to deliver 750 volts or 1500 volts.

15. A method for charging a battery in a vehicle, the method comprising:

monitoring a state of charge of the battery under a condition where the vehicle is in a dormant state, the vehicle including a hybrid power system including one or more electric motors and a power source, both connected to the battery;

determining that the state of charge of the battery is above a minimum level while the vehicle is in the dormant state, the vehicle subsequently remaining in the dormant state;

after said determining that the state of charge of the battery is above the minimum level and with the vehicle remaining in the dormant state, determining that the state of charge of the battery is below the minimum level;

after determining that the state of charge of the battery is below the minimum level, determining a fuel level of the vehicle; and activating the power source to generate electrical power and charging the battery, via the power source, at least until the state of charge of the battery is above the minimum level, only under a condition where the fuel level of the vehicle is above a fuel target.

16. The method of claim 15 further comprising determining that the fuel level of the vehicle is below the fuel target, and alerting an operator based on determining that the fuel level of the vehicle is below the fuel target.

17. The method of claim 16, wherein the power source includes an internal combustion engine.

18. The method of claim 16, wherein the power source includes a fuel cell electric system.

19. The method of claim 16 further comprising performing a vehicle shutdown based on determining that the fuel level of the vehicle is below the fuel target.

20. The method of claim 15, further comprising probing a fuel level sensor and outputting a message under a condition where the state of charge of the battery is not above the minimum level and the fuel level of the vehicle is not above the fuel target, the message indicating the state of charge of the battery is below the minimum level and the fuel level of the vehicle is below the fuel target, wherein the fuel level sensor is connected to a fuel tank to obtain the fuel level of the vehicle.

* * * * *